(12) United States Patent
Manohararajah et al.

(10) Patent No.: US 7,509,597 B1
(45) Date of Patent: Mar. 24, 2009

(54) METHOD AND APPARATUS FOR PERFORMING POST-PLACEMENT FUNCTIONAL DECOMPOSITION ON FIELD PROGRAMMABLE GATE ARRAYS USING BINARY DECISION DIAGRAMS

(75) Inventors: Valavan Manohararajah, Scarborough (CA); Deshanand Singh, Mississauga (CA); Stephen Brown, Toronto (CA)

(73) Assignee: Altera Corporation, San Jose, CA (US)

( * ) Notice: Subject to any disclaimer, the term of this patent is extended or adjusted under 35 U.S.C. 154(b) by 342 days.

(21) Appl. No.: 11/172,007

(22) Filed: Jun. 30, 2005

(51) Int. Cl.
*G06G 17/50* (2006.01)
(52) U.S. Cl. .......................................................... 716/2
(58) Field of Classification Search ...................... 716/2
See application file for complete search history.

(56) References Cited

U.S. PATENT DOCUMENTS 6,212,669 B1 * 4/2001 Jain ............................... 716/7
7,117,463 B2 * 10/2006 Graham et al. ................. 716/5

OTHER PUBLICATIONS

Cong et al, "Combinational Logic Synthesis for LUT Based Field Programmable Gate Arrays", ACM Transactions on Design Automation of Electronic Systems, vol. 1, Issue 2, Apr. 1996, pp. 145-204.*
Murgai et al., Performance directed synthesis for table look up programmable gate arrays, Computer-Aided Design, 1991. ICCAD-91. Digest of Technical Papers., 1991 IEEE International Conference on, Nov. 11-14, 1991 pp. 572-575.*

* cited by examiner

*Primary Examiner*—Jack Chiang
*Assistant Examiner*—Brandon W Bowers
(74) *Attorney, Agent, or Firm*—L. Cho

(57) ABSTRACT

A method for designing a system on a field programmable gate array (FPGA) includes using binary decision diagrams (BDDs) to perform functional decomposition on a design for the system after placement.

19 Claims, 8 Drawing Sheets

US 7,509,597 B1

METHOD AND APPARATUS FOR PERFORMING POST-PLACEMENT FUNCTIONAL DECOMPOSITION ON FIELD PROGRAMMABLE GATE ARRAYS USING BINARY DECISION DIAGRAMS

TECHNICAL FIELD

The present invention relates to the field of field programmable gate arrays (FPGAs). More specifically, the present invention relates to a method and apparatus for performing post-placement functional decomposition on systems on FPGAs using binary decision diagrams.

BACKGROUND

FPGAs may be used to implement large systems that include millions of gates and megabits of embedded memory. Of the tasks required in managing and optimizing a design, placement of components on the FPGAs and routing connections between components on the FPGA utilizing available resources can be the most challenging and time consuming. In order to satisfy placement and timing specifications, several iterations are often required to determine how components are to be placed on the target device and which routing resources to allocate to the components. The complexity of large systems often requires the use of EDA tools to manage and optimize their design onto physical target devices. Automated placement and routing algorithms in EDA tools perform the time consuming task of placement and routing of components onto physical devices.

The design of a system is often impacted by the connection delays routed along the programmable interconnect of the target device. The interconnect provides the ability to implement arbitrary connections, however, it includes both highly capacitive and resistive elements. The delay experienced by a connection is affected by the number of routing elements used to route the connection. Traditional approaches for reducing the delay were targeted at improving the automated placement and routing algorithms in the EDA tools. Although some reductions in delay were achieved with these approaches, the approaches were not able to perform further improvements to the system after the placement and routing phases. It is often only after the placement phase and/or routing phase of the FPGA computer automated design (CAD) flow when connection delays power dissipation on the interconnect are fully known.

In addition, traditional approaches of functional decomposition used for improving the synthesis procedure in the CAD flow utilized data structures such as truth tables that were exponential in the number of variables present in a function being decomposed. This required EDA tools to utilize a large amount of memory and to implement algorithms that were slow in nature.

Thus, what is needed is an efficient and effective method and apparatus for performing layout-driven optimizations on FPGAs after the placement phase of the FPGA CAD flow.

SUMMARY

According to an embodiment of the present invention, alternative decompositions of logic on a critical path in a system design are examined for improvements after placement in a FPGA CAD flow. The improvements may relate, for example, to timing driven improvements or transition density improvements. Binary decision diagrams (BDDs) are used to represent the logic and the alternative decompositions of the logic. The placed circuit is then modified to use the best decomposition found. If illegalities in placement exist, non-critical components are shifted in order to satisfy the preferred locations and produce a legal placement.

BRIEF DESCRIPTION OF THE DRAWINGS

The features and advantages of the embodiments of the present invention are illustrated by way of example and are by no means intended to limit the scope of the embodiments of the present invention to the particular embodiments shown.

DETAILED DESCRIPTION

Figure 1:
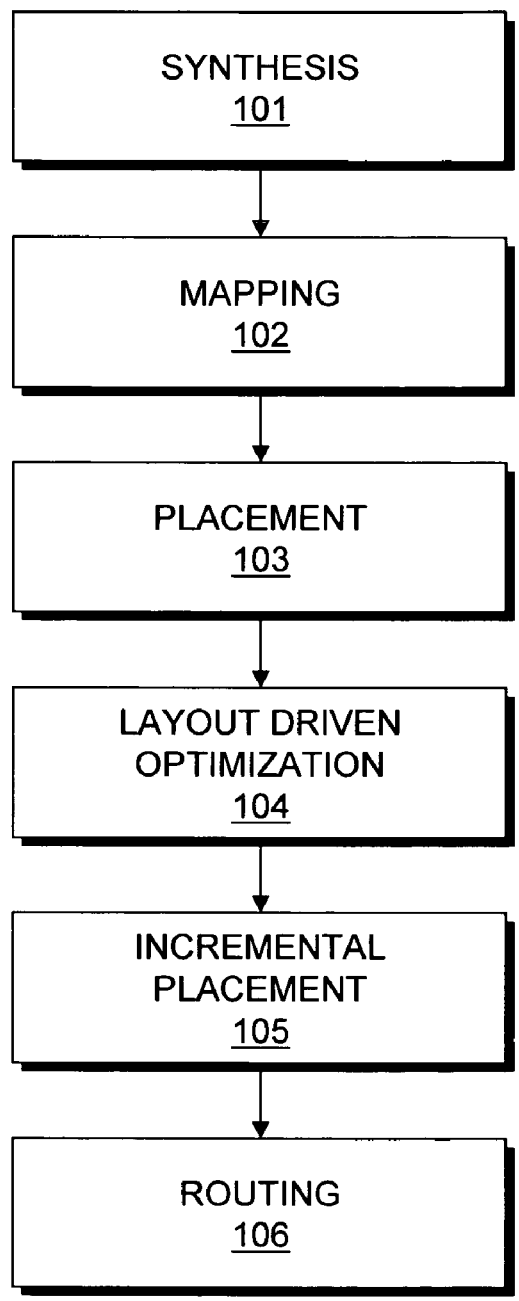
FIG. 1 is a flow chart illustrating a method for designing a system according to an embodiment of the present invention.

FIG. 1 is a flow chart that illustrates a method for designing a system according to an embodiment of the present invention. The method may be performed with the assistance of an EDA tool, for example. At 101, synthesis is performed. Synthesis includes generating a logic design of the system to be implemented by a target device. According to an embodiment of the present invention, synthesis generates an optimized logical representation of the system from a Hardware Description Language (HDL) design definition. The optimized logical representation of the system may include a representation that includes a minimized number of logic gates and logic elements required for the system. Alternatively, the optimized logical representation of the system may include a representation that has a reduced depth of logic and that generates a lower signal propagation delay.

Figure 2:
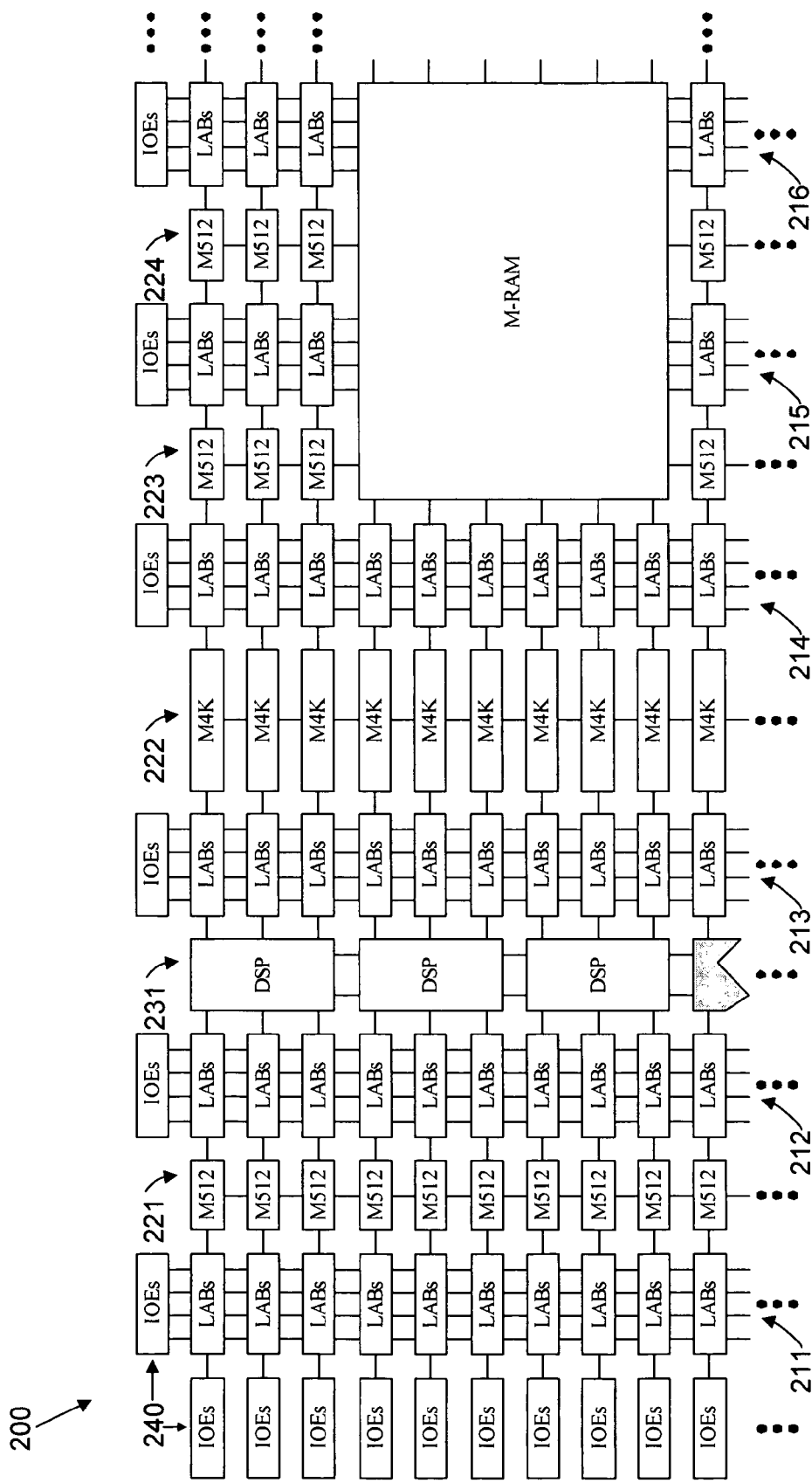
FIG. 2 illustrates a target device utilizing FPGAs according to an embodiment of the present invention.

FIG. 2 illustrates an exemplary target device 200 utilizing FPGAs according to an embodiment of the present invention. The present invention may be used to design a system onto the target device 200. According to one embodiment, the target device 200 is a chip having a hierarchical structure that may take advantage of wiring locality properties of circuits formed therein.

The target device 200 includes a plurality of logic-array blocks (LABs). Each LAB may be formed from 10 logic elements (LEs), LE carry chains, LAB control signals, LUT chain, and register chain connection lines. An LE is a small unit of logic providing efficient implementation of user logic functions. According to one embodiment of the target device 200, an LE may include a 4-input lookup table (LUT) with a configurable flip-flop. LUT chain connections transfer the output of one LE's LUT to the adjacent LE for fast sequential LUT connections within the same LAB. Register chain connection lines transfer the output of one LE's register to the adjacent LE's register within a LAB. Alternatively, instead of being formed by 10 LEs, a LAB may be formed with 8 adaptive logic modules (ALMs). An ALM may include 2 registers, 2 sets of addition circuitry, a combinational logic module that may be configured two single 6-LUT, or two LUTs with five or fewer inputs. LABs are grouped into rows and columns across the target device 200. Columns of LABs are shown as 211-216.

The target device 200 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 200. Columns of memory blocks are shown as 221-224.

The target device 200 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the target device 200 and are shown as 231. The target device 200 includes a plurality of input/output elements (IOEs) 240. Each IOE feeds an I/O pin (not shown) on the target device 200. The IOEs are located at the end of LAB rows and columns around the periphery of the target device 200. Each IOE includes a bidirectional I/O buffer and a plurality of registers for registering input, output, and output-enable signals. When used with dedicated clocks, the registers provide performance and interface support with external memory devices.

The target device 200 includes LAB local interconnect lines (not shown) that transfer signals between LEs in the same LAB. The LAB local interconnect lines are driven by column and row interconnects and LE outputs within the same LAB. Neighboring LABs, memory blocks, or DSP blocks may also drive the LAB local interconnect lines through direct link connections.

The target device 200 also includes a plurality of row interconnect lines ("H-type wires") (not shown) that span fixed distances. Dedicated row interconnect lines, route signals to and from LABs, DSP blocks, and memory blocks within the same row. The row interconnect lines may span a distance of up to four, eight, and twenty-four LABs respectively, and are used for fast row connections in a four-LAB, eight-LAB, and twenty-four-LAB region. The row interconnects may drive and be driven by LABs, DSP blocks, RAM blocks, and horizontal IOEs. The target device 200 also includes a plurality of column interconnect lines ("V-type wires") (not shown) that operate similarly to the row interconnect lines. The column interconnect lines vertically routes signals to and from LABs, memory blocks, DSP blocks, and IOEs. Each column of LABs is served by a dedicated column interconnect, which vertically routes signals to and from LABs, memory blocks, DSP blocks, and IOEs. The column interconnect lines may traverse a distance of four, eight, and sixteen blocks respectively, in a vertical direction.

FIG. 2 illustrates an exemplary embodiment of a target device. It should be appreciated that a system may include a plurality of target devices, such as that illustrated in FIG. 2, cascaded together. It should also be appreciated that the target device may include programmable logic devices arranged in a manner different than that on the target device 200. A target device may also include FPGA resources other than those described in reference to the target device 200. Thus, while the invention described herein may be utilized on the architecture described in FIG. 2, it should be appreciated that it may also be utilized on different architectures, such as those employed by Altera® Corporation in its APEX™, Stratix™, Cyclone™, Stratix™ II, and Cyclone™ II families of chips and those employed by Xilinx® Inc. in its Virtex™ and Virtex™ II, and Virtex IV™ line of chips.

Referring back to FIG. 1, at 102, the optimized logical design of the signal is mapped. Mapping includes determining how to implement components such as logic gates and other components in the optimized logic representation with resources available on a target device. According to an embodiment of the present invention, a netlist is generated from mapping. The netlist illustrates how the resources of the target device are utilized to implement the system. The netlist may, for example, include a representation of the components on the target device and how the components are connected. Mapping may include, for example, determining how components may be implemented using LEs or ALMs. The components may include, for example, digital logic such as logic gates, memory devices, and/or other components. Mapping may also include, for example, determining which LEs or ALMs should be packed together in a LAB. Although the resources on a target device are assigned for implementing the components, the specific resources and their locations are not assigned in 102.

At 103, the mapped logical system design is placed. Placement includes fitting the system on the target device by determining which resources (and their location) on the target device is to be used for specific components and connections between the components. The placement procedure may be performed by a placer in an EDA tool that utilizes placement algorithms. According to an embodiment of the present invention, a user (designer) may provide input to the placer by specifying placement constraints. The constraints may include defining logic regions that group certain components of a system together. The size of the logic regions may be determined by the user or by a sizing method. The placement of the logic regions may be determined by the user or by a placement method.

At 104, layout-driven optimizations are performed. According to an embodiment of the present invention, routing delays for the connections on the netlist are estimated by calculating a fastest possible route. Timing-driven netlist optimization techniques may be applied to restructure the netlist to reduce the critical path(s). The netlist may be restructured by the EDA tool performing the synthesis, mapping and placement. Restructuring the netlist may include adding, deleting, moving, or modifying components in the original optimized logical representation generated during synthesis. According to an alternate embodiment of the present invention, transition density optimization techniques may be applied to restructure the netlist to reduce the power consumption of the system. According to an embodiment of the present invention, criticality may be identified for nodes, connections, or sections in the design that exceed or is close to exceeding a timing constraint, power dissipation constraint, or other constraint.

Optimization of the layout of the system may be achieved by performing functional decomposition to critical sections of the systems. Given a function $f(X,Y)$ defined over two sets of variables X and Y, functional decomposition finds subfunctions $g_1(Y), g_2(Y), \ldots, g_k(Y)$ such that $f$ can be re-expressed in terms of gs: $f(X, g_1(Y), g_2(Y), \ldots, g_k(Y))$. The set of variables X is referred to as the free set and the set of variables Y is referred to as the bound set. If there are no variables common to X and Y, the decomposition is said to be disjoint. Otherwise, the decomposition is said to be non-disjoint.

According to an embodiment of the present invention, a binary decision diagram (BDD) is generated to represent logic in the critical sections of the system. A BDD is a directed acrylic graph that includes two types of vertices, non-terminal and terminal. Non-terminal vertices are associated with variables (or nodes) that represent signals in a system and terminal vertices are associated with Boolean constants. Every non-terminal vertex has two outgoing edges: a 0-edge representing the result of assigning 0 to the variable at the vertex, and a 1-edge representing the result of assigning 1 to the variable at the vertex. A BDD may be reduced so that it does not include two or more vertices implementing the same function. Two vertices implement the same function if they are associated with identical variables and their 0-edge and 1-edge point to the same vertices. A BDD may also be reduced when a 0-edge and a 1-edge point to the same node. In this situation, the vertex is considered redundant and is removed. A BDD is ordered according to a specified order if a vertex associated with a first variable points to a vertex associated with a second variable only if the second variable follows the first variable in the specified order.

Figure 3:
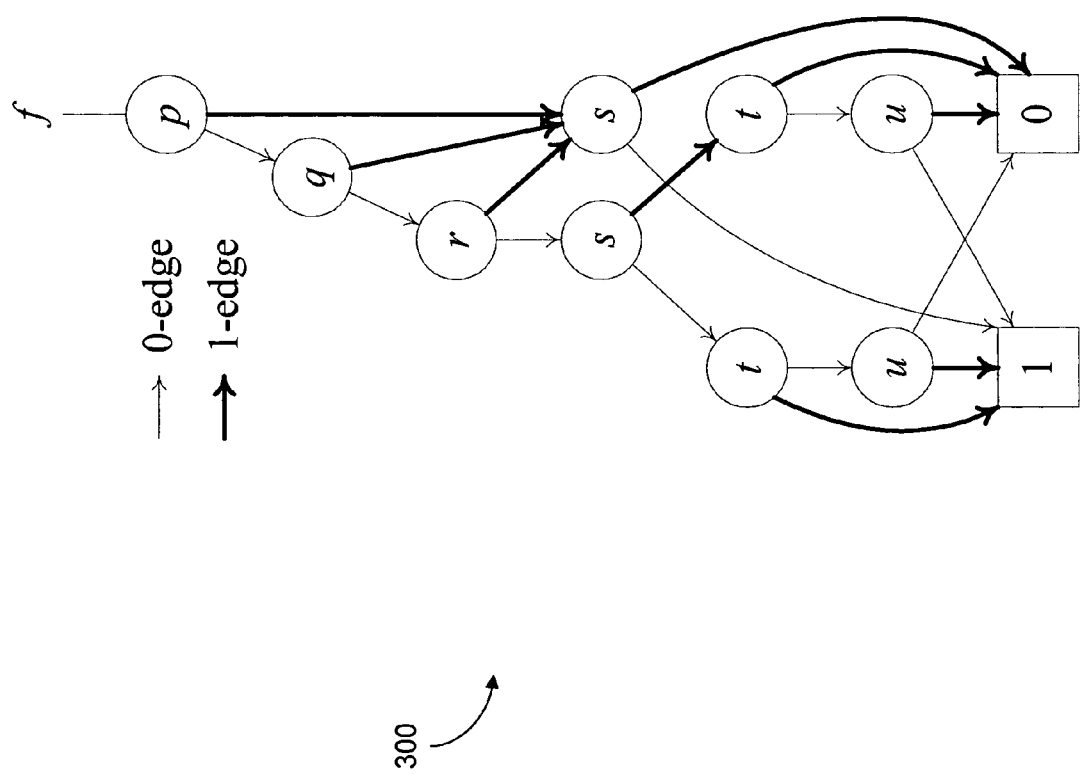
FIG. 3 illustrates a binary decision diagram of an exemplary function according to an embodiment of the present invention.

FIG. 3 illustrates an exemplary BDD 300. The BDD 300 is a reduced, alphabetically ordered BDD for the function $f=(p+q+r)\bar{s}+\overline{(p+q+r)}(\bar{s}t+\bar{s}u+s\bar{t}\bar{u})$. This function has a disjoint decomposition with bound set $\{p, q, r\}$ and free set $\{s, t, u\}$.

Figure 4:
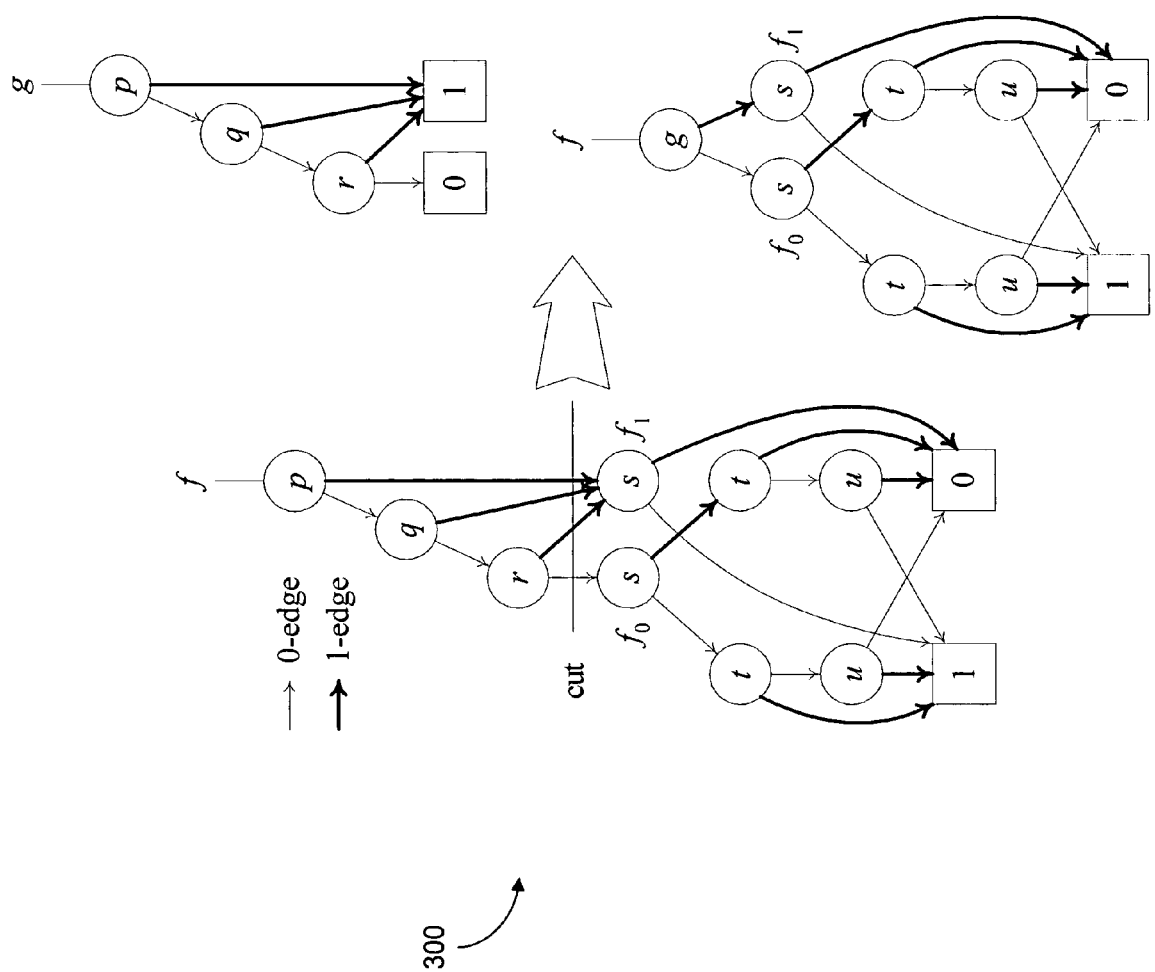
FIG. 4 illustrates the decomposition of the exemplary function according to an embodiment of the present invention.

FIG. 4 illustrates the decomposition of a function represented by a BDD 300 according to an exemplary embodiment of the present invention. A subfunction, $g=p+q+r$, defined over the bound set can be extracted from $f$, and $f$ can be re-expressed terms of g as $f=g\bar{s}+\bar{g}(\bar{s}t+\bar{s}u+s\bar{t}\bar{u})$. This decomposition can be obtained from the BDD as follows. A cut in the BDD establishes two sets of variables. The variables above the cut constitute the bound set and the variables below the cut constitute the free set. FIG. 4 illustrates a cut in f that separates the bound set, $\{p, q, r\}$, from the free set $\{s, t, u\}$. The portion of the BDD above the cut references two distinct functions, $f_0$ and $f_1$, below the cut. Thus, the portion of the BDD above the cut can be replaced by a single Boolean variable g that determines whether $f_0$ or $f_1$ is to be selected. A separate BDD computes the value for g, and in the new BDD $f$, or $f_0$ is selected when g=0 and $f_1$ is selected when g=1.

When more than two distinct functions are being referenced below a cut, more than a single variable is needed to encode the information needed to select one of the functions. If there are n distinct functions below the cut then $\log_2 n$ variables will be needed to encode the selection information.

Referring back to FIG. 1, at 105, incremental placement is performed. The changes to the netlist generated from layout-driven optimization are placed on the layout of the existing system placed at 103. Incremental placement involves evaluating resources on a target device such as LABs that have architectural violations or illegalities from layout-driven optimizations. Incremental placement attempts to restructure the preferred locations as little as possible to ensure that the final placement respects all architectural constraints. Incremental placement attempts to identify non-critical LEs or ALMs that may be moved from their preferred locations to resolve architectural violations in order that truly critical elements may stay at their preferred locations. Incremental placement may be performed by an incremental placement engine (not shown) in the EDA tool that utilizes incremental placement algorithms. It should be appreciated that several iterations of layout-driven optimizations and incremental placement may be performed.

At 106, routing of the system is performed. During routing, routing resources on the target device are allocated to provide interconnections between logic gates, logic elements, and other components on the target device.

Figure 5:
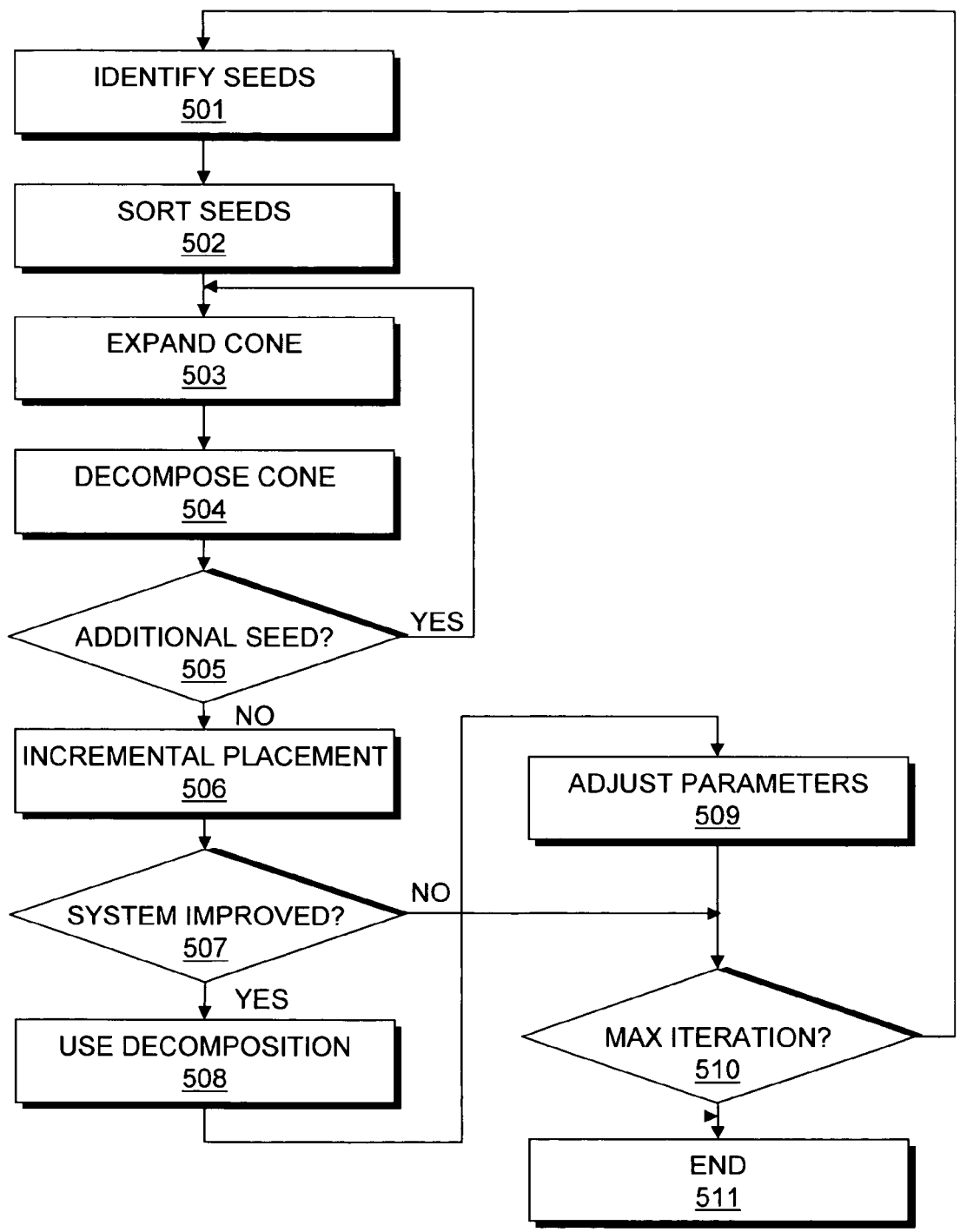
FIG. 5 is a flow chart illustrating a method for performing functional decomposition according to an embodiment of the present invention.

FIG. 5 is a flow chart illustrating a method for performing functional decomposition according to an embodiment of the present invention. The method shown in FIG. 5 may be used to implement 104 and 105 shown in FIG. 1. At 501, seeds in the system are identified. According to an embodiment of the present invention, a seed may be a resource on the target device such as a LUT that is in a critical section of the system or that exhibits characteristics of high criticality. In an embodiment where functional decomposition is focused on timing driven improvements, a seed may be a LUT having an input with a slack or slack ratio that is below a threshold value. In this embodiment, a timing analysis may first be performed where delays of connection between circuit components are estimated.

At 502, the identified seeds are sorted. The seeds may be sorted according to cost such that seeds with a higher potential for improving the system design may be considered before seeds with a lower potential for improving the system design. According to an embodiment of the present invention a cost function may be utilized to determine the cost associated with each seed. The cost may be defined with the following relationship.

$$C_{LUT}=(1.0-r_{min})^\alpha(r_{avg}-r_{min})$$

In this relationship, $r_{min}$ is the minimum of the input slack ratios and $r_{avg}$ is the average of the input slack ratios. The exponent $\alpha$ is used to control which of the two components of cost has a higher effect on the final cost. Higher values of cost indicate that the potential for improvement is higher.

At 503, for each seed identified, a cone is expanded from the seed. According to an embodiment of the present invention, the cone may be expanded to include additional resources on the target device which include outputs that feed into the cone and/or additional resources that exhibit a degree of criticality similar to the seed. It should be appreciated that other criteria may be used to expand a cone from the seed.

Figure 6:
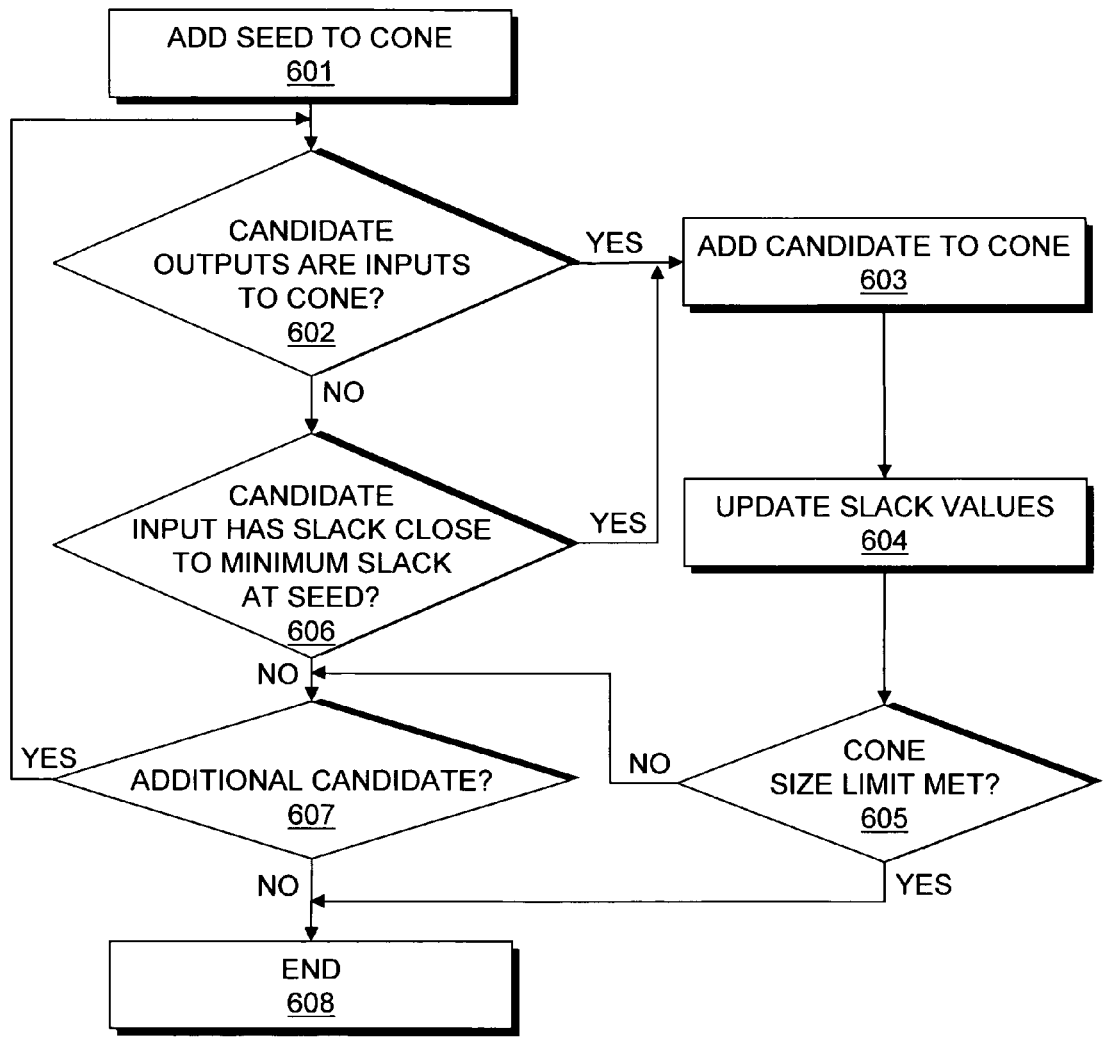
FIG. 6 is a flow chart illustrating a method for performing cone expansion according to an embodiment of the present invention.

FIG. 6 is a flow chart that illustrates a method for performing cone expansion according to an embodiment of the present invention. The method shown in FIG. 6 may be implemented at 503 in FIG. 5. At 601, a seed is added to a cone.

At 602, it is determined whether a candidate LUT has outputs that are all inputs to the cone. If the candidate LUT has outputs that are all inputs to the cone, control proceeds to 603. If the candidate LUT has outputs that are not all inputs to the cone, control proceeds to 606.

At 603, the candidate LUT is added to the cone.

At 604, slack values are updated. According to an embodiment of the present invention, the slack of the inputs to the cone are updated under the assumption that there is a large LUT implementing the functionality of the cone at a same position as the seed LUT.

At 605, it is determined whether the cone has met its size limit. According to an embodiment of the present invention, this may be determined by comparing a number of BDD nodes in the cone with a threshold number. If the cone has not met its size limit, control proceeds to 607. If the cone has met its size limit, control proceeds to 608.

At 606, it is determined whether the candidate LUT has inputs with slack values sufficiently close to the minimum slack value observed at the seed. If it is determined that the candidate LUT has inputs with slack values sufficiently close to the minimum slack value observed at the seed, control proceeds to 603. If it is determined that the candidate LUT has inputs with slack values that are not sufficiently close to the minimum slack value observed at the seed, control proceeds to 607.

At 607, it is determined whether additional candidate LUTs exist for consideration. If additional LUTs exist for consideration, control returns to 602. If additional LUTs do not exist for consideration, control terminates the procedure as shown at 608.

Referring back to 504, the cone identified at 503 is decomposed. According to an embodiment of the present invention, the cone is decomposed by performing functional decomposition on a BDD that represents the cone's functionality. Decomposing the BDD involves extracting a single subfunction from the BDD and re-expressing the remaining variables in the BDD. According to an embodiment of the present invention, extracting a single subfunction involves identifying variables in the BDD to group together to be implemented by a single LUT. It should be appreciated that the size of the subfunctions extracted is determined by the type of LUTs supported by the target device.

Figure 7:
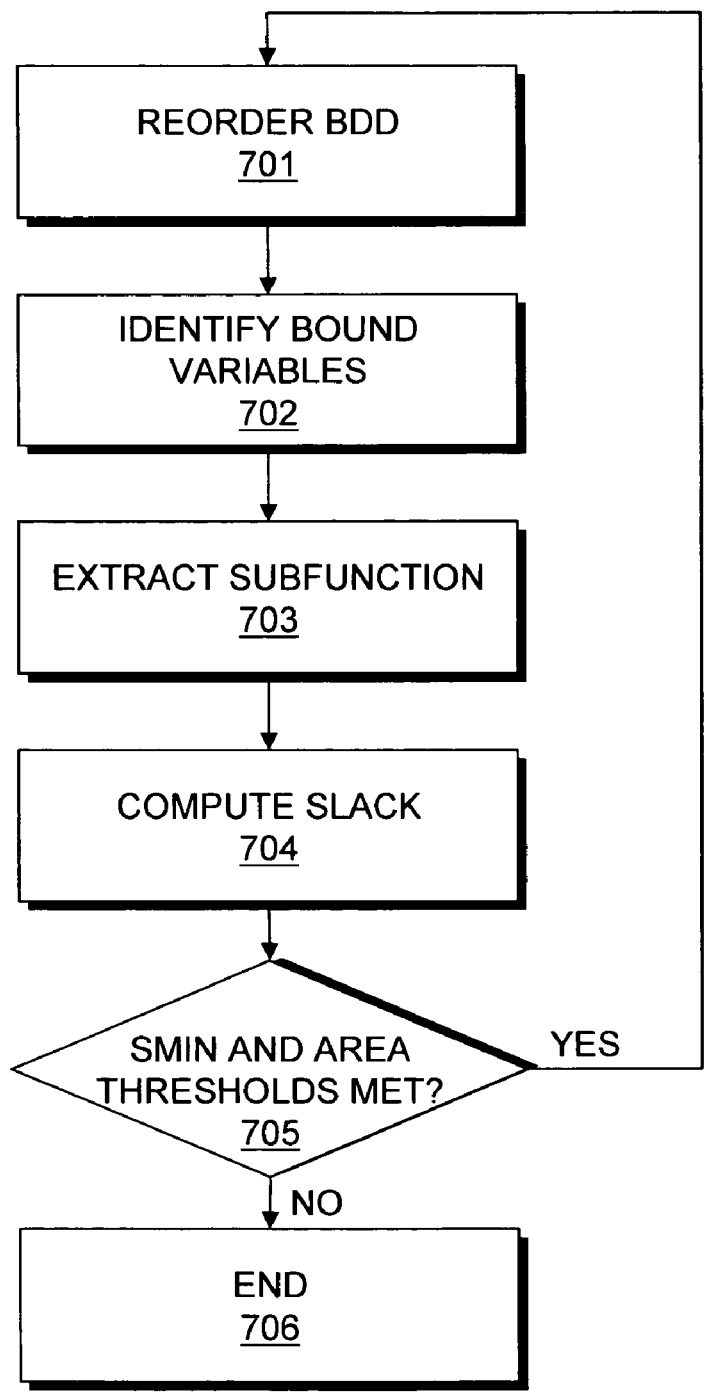
FIG. 7 is a flow chart illustrating a method for performing cone decomposition according to an embodiment of the present invention.

FIG. 7 is a flow chart that illustrates a method for performing cone decomposition according to an embodiment of the present invention. The method shown in FIG. 7 may be utilized at 504 in FIG. 5. At 701, variables in the BDD are reordered. The variables in the BDD are reordered such that variables associated with the highest slack are moved to the top of the BDD, and such that each level of the BDD includes a number of variables no greater than a number of inputs supported by the LUTs in the target device. According to an embodiment of the present invention, a cost function that reflects the suitability of the variable order for decomposition is used. The cost function may be described with the following relationship.

$$C_{order} = \eta_{nodes} \eta_{functions}^{\beta} / s_{total}$$

In this relationship, $\eta_{nodes}$ is the total number of BDD nodes in the cone. The term $\eta_{functions}$ represents the number of distinct functions below every bound set of interest. The term $s_{total}$ represents the total slack of the first k variables where k is the maximum LUT size in the target device. The term $\beta$ is a constant that may be adjusted to increase the effect of $\eta_{functions}$.

At 702, a set of bound variables is identified. A set of variables at the top of the BDD is selected to be part of a bound set. According to an embodiment of the present invention, a number of new variables that result after subfunction extraction is limited to two and the number of shared variables, in a non-disjoint decomposition, is limited to one. Of the available choices for the bound set, a bound set that results in a decomposition with the highest ratio of variables removed to variables added is selected.

At 703, the set of bound variables representing a subfunction is extracted. According to an embodiment of the present invention, extracting the subfunction involves grouping the variables in the set of bound variables together to be implemented in the same LUT.

At 704, slack is computed for a new variable representing the subfunction extracted. According to an embodiment of the present invention, the slack of the new variable may be computed with the following relationship.

$$s'(v) = \min\{s'(u) | u \in \text{support}(v)\} - d_{avg}$$

In this relationship, $d_{avg}$ is the average delay for a single level of logic, including the LUT delay and interconnect delay, in the cone. The term support(v) is the set of variables that v depends on.

At 705, it is determined whether $s_{min}$, the minimum slack observed at the seed LUT, is met and whether the area threshold for the BDD has not been exceeded. If both $s_{min}$ is met and the area threshold for the BDD has not been exceeded, control returns to 701. If either $s_{min}$ has not been met or the area threshold for BDD has been exceeded, control terminates the procedure as shown at 706.

Referring back to FIG. 5, at 505, it is determined whether additional seeds exist to expand into cones. If additional seeds exist, control returns to 503. If additional seeds do not exist, control proceeds to 506.

At 506, incremental placement is performed. Incremental placement involves evaluating resources on a target device such as LABs that have architectural violations or illegalities from layout-driven optimizations. Incremental placement attempts to restructure the preferred locations as little as possible to ensure that the final placement respects all architectural constraints. Incremental placement attempts to identify non-critical LEs or ALMs that may be moved from their preferred locations to resolve architectural violations in order that truly critical elements may stay at their preferred locations.

At 507, it is determined whether the system is improved. According to an embodiment of the present invention where timing driven improvements is desired, this may be achieved by performing a timing analysis and comparing the timing of the new system design with a previous system design. If the system is improved, control proceeds to 508. If the system is not improved, control proceeds to 510.

At 508, the new decomposition is used in the system design.

At 509, the parameters for the system design are adjusted. The parameters adjusted may include the new slack values computed for the decomposition.

At 510, it is determined whether a maximum number of iterations of the procedure has been performed. If the maximum number of iterations have not been performed, control returns to 501. If the maximum number of iterations have been performed, control proceeds to 511.

At 511, control terminates the procedure.

FIGS. 1, 5, 6, and 7 are flow charts illustrating embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Figure 8:
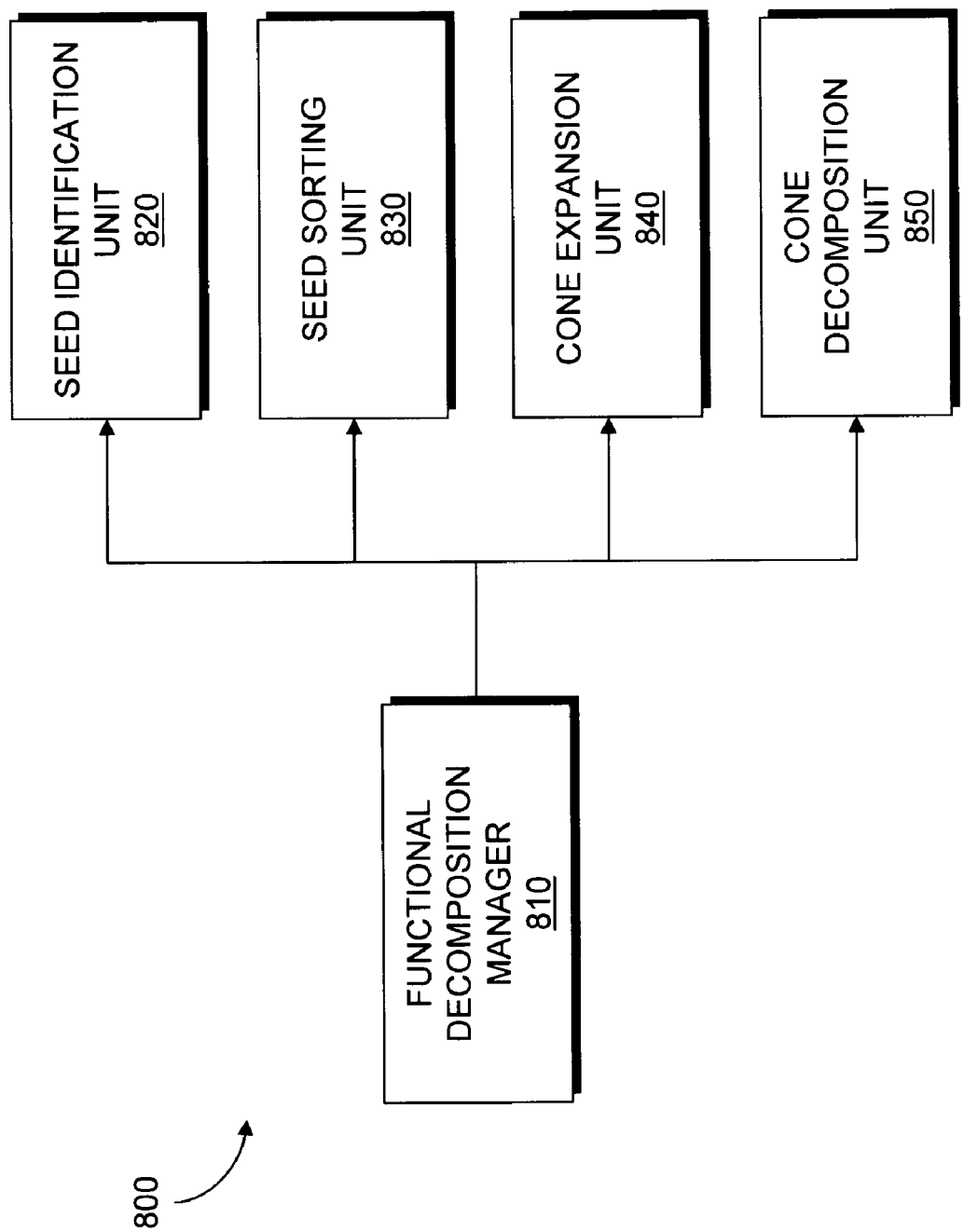
FIG. 8 is a block diagram of a functional decomposition unit according to an embodiment of the present invention.

FIG. 8 is a block diagram of a functional decomposition unit 800 according to an embodiment of the present invention. The functional decomposition unit 800 includes a plurality of modules. The modules may be implemented by software, hardware, or a combination of hardware or software. According to an embodiment of the present invention, the functional decomposition unit 800 resides in an EDA tool used for designing a system on a physical target device. The functional decomposition unit 800 includes a functional decomposition manager 810. The functional decomposition manager 810 interfaces with and transmits information between other components in the functional decomposition unit 800. The functional decomposition unit 800 includes a seed identification unit 820. The seed identification unit 820 identifies seeds in a system. A seed may be a resource on the target device such as a LUT that is in a critical section of the system design. In an embodiment where functional decomposition is focused on timing driven improvements, a seed may be a LUT having an input with a slack or slack ratio that is below a threshold value.

The functional decomposition unit 800 includes a seed sorting unit 830. The seed sorting unit 830 sorts seeds according to cost such that seeds with a higher potential for improving the system design may be considered before seeds with a lower potential for improving the system design. According to an embodiment of the present invention a cost function may be utilized to determine the cost associated with each seed. The cost may be defined with the relationship $C_{LUT}=(1.0-r_{min})^\alpha(r_{avg}-r_{min})$.

The functional decomposition unit 800 includes a cone expansion unit 840. The cone expansion unit 840 expands a cone from each seed identified. According to an embodiment of the present invention, the cone may be expanded to include additional resources on the target device that correspond to the seed. The resources may include those which include outputs that feed into the cone and/or additional resources that exhibit a degree of criticality similar to the seed. It should be appreciated that other criteria may be used to expand a cone from the seed. The cone expansion unit 840 may perform procedures described with reference to FIG. 6.

The functional decomposition unit 800 includes a cone decomposition unit 850. The cone decomposition unit 850 performs functional decomposition on a BDD that represents a cone's functionality. Decomposing the BDD involves extracting a single subfunction from the BDD and re-expressing the remaining variables in the BDD. The cone decomposition unit 850 may perform procedures described with reference to FIG. 7.

Embodiments of the present invention have been described with reference to performing functional decomposition in order to achieve timing driven improvements to the system. It should be appreciated, however, that functional decomposition may be performed to achieve other types of improvements to the system. For example, transition density may be improved by using power consumption data when identifying and sorting seeds, and expanding and decomposing cones.

Embodiments of the present invention may be provided as a computer program product or software that may include an article of manufacture on a machine accessible or a machine readable medium having instructions. The instructions on the machine accessible medium may be used to program a computer system or other electronic device. The machine accessible medium may include, but is not limited to, floppy diskettes, optical disks, CD-ROMs, magneto-optical disks, or other types of media/machine accessible medium suitable for storing or transmitting electronic instructions. The technique described herein are not limited to any particular software configuration. They may find applicability in any computing or processing environment. The term "machine accessible medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g. program, procedure, process, application, module, unit, logic, and so on) as taking an action or causing a result. Such expressions are merely a shorthand way of stating that the execution of the software by a processing system causes the processor to perform an action to produce a result.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for designing a system on a field programmable gate array (FPGA), comprising:
   identifying a seed utilizing slack ratios;
   expanding a cone originating at the seed; and
   using binary decision diagrams (BDDs) to perform functional decomposition on a design for the system by decomposing components in the cone after synthesis, mapping, and placement of components on a target device have been completed.

2. The method of claim 1, wherein identifying the seed further comprises using power consumption data.

3. The method of claim 1, wherein expanding the cone comprises determining whether inputs to a candidate component have stack values comparable to a slack value at the seed.

4. The method of claim 1, where expanding the cone comprises determining whether outputs of a candidate component are inputs to the cone.

5. The method of claim 1, wherein using BDDs comprises re-ordering variables in the BDD representing signals in the system.

6. The method of claim 5, wherein reordering comprises placing variables with high slack on a top of the BDD.

7. The method of claim 5, wherein re-ordering comprises placing variables with high transition density on a top of the BUD.

8. The method of claim 5, wherein re-ordering comprises moving the variables such that levels in the BDD have no more than a given number of distinct functions below the levels.

9. The method of claim 5, further comprising identifying a first plurality of signals at a top of the BDD to implement with a first LUT in the FPGA.

10. The method of claim 9, further comprising:
    re-ordering the nodes; and
    identifying a second plurality of signals at the top of the BDD to implement with a second LUT in the FPGA.

11. The method of claim 1, further comprising:
    synthesizing the system;
    mapping the system; and
    performing placement of the components on of the system on the target device.

12. An article of manufacture comprising a machine accessible medium including sequences of instructions, the sequences of instructions including instructions which when executed cause the machine to perform:
    identifying a seed utilizing slack ratios;
    expanding a cone originating at the seed; and
    using binary decision diagrams (BBDs) to perform functional decomposition on a design for a system on a field programmable gate array (FPGA) by decomposing components in the cone after synthesis, mapping, and placement.

13. The article of manufacture of claim 12, wherein using BDDs comprises re-ordering variables in the BDD representing signals in the system.

14. The article of manufacture of claim 13, wherein re-ordering comprises placing variables with high slack on a top of the BDD.

15. The article of manufacture of claim 13, wherein re-ordering comprises placing variables with high transition density on top of the BDD.

16. The article of manufacture of claim 13, wherein re-ordering comprises moving the variables such that levels in the BDD have no more than a given number of distinct functions below the levels.

17. A functional decomposition unit, comprising:

a seed identification unit that identifies resources on a system associated with high criticality utilizing slack ratios;

a cone expansion unit that identifies additional resources on the system that corresponds to the resources by expanding a cone originating at the resources associated with high criticality; and a cone decomposition unit that performs functional decomposition on a binary decision diagram that represents the resources associated with high criticality and the additional resources after synthesis, mapping, and placement of components on a target device have been completed.

18. The apparatus of claim 17, further comprising a seed sorting unit that prioritizes the resources identified by the seed identification unit for consideration.

19. The apparatus of claim 17, wherein the cone decomposition unit extracts a single subfunction from the BDD and re-expresses remaining variables in the BDD.

* * * * *